Aug. 20, 1940.                    J. A. KRASNOV                    2,212,485
           SLIP COVER CONSTRUCTION FOR UPHOLSTERED FURNITURE
                     Filed Aug. 14, 1937        5 Sheets-Sheet 1

INVENTOR
JOSEPH A. KRASNOV
BY
Leonard L. Kalish
ATTORNEY

Aug. 20, 1940.  J. A. KRASNOV  2,212,485
SLIP COVER CONSTRUCTION FOR UPHOLSTERED FURNITURE
Filed Aug. 14, 1937   5 Sheets-Sheet 2
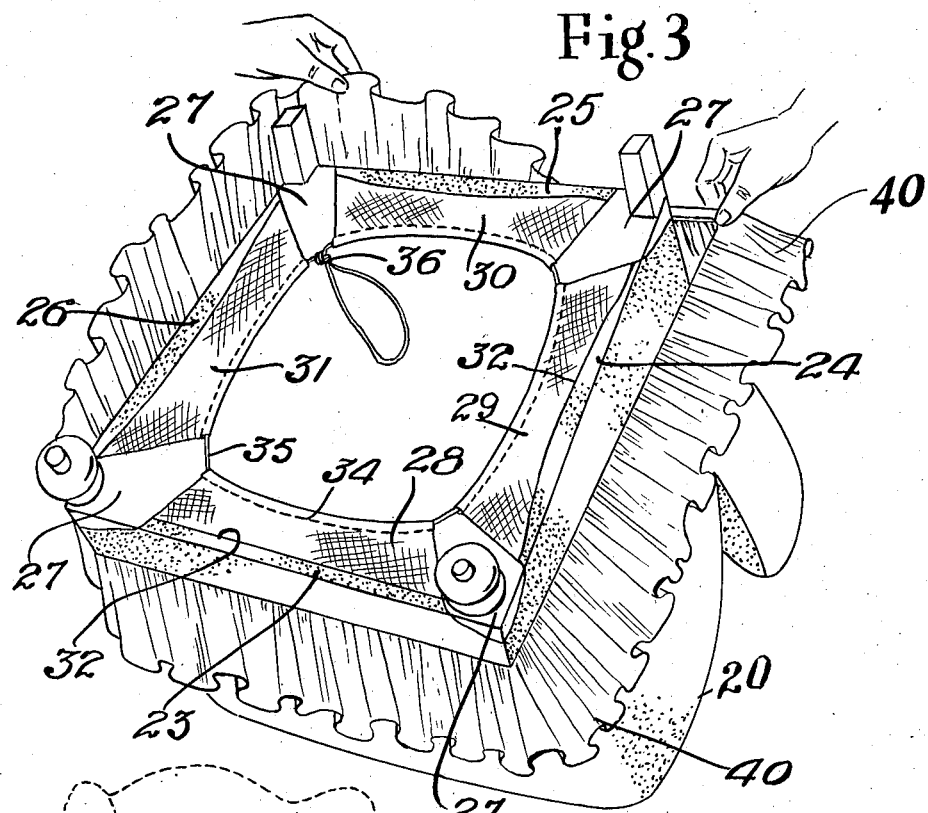
Fig. 3
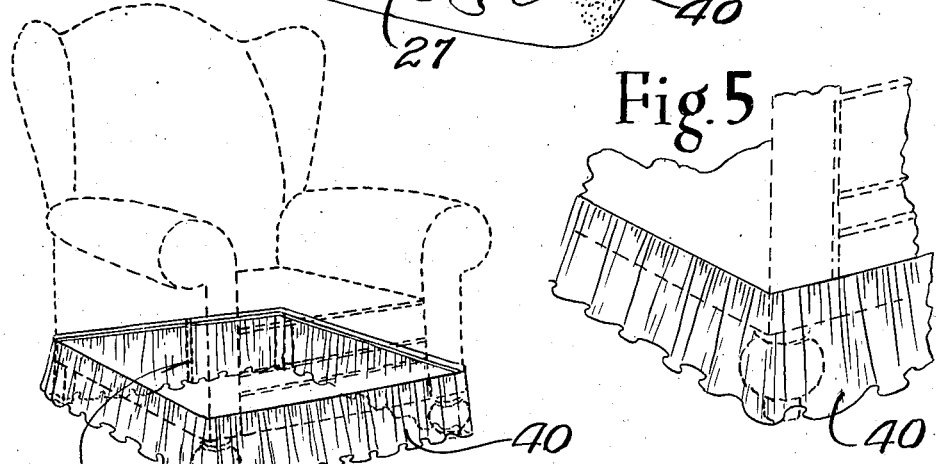
Fig. 5
Fig. 4
INVENTOR
JOSEPH A. KRASNOV
BY
ATTORNEY Aug. 20, 1940.    J. A. KRASNOV    2,212,485
SLIP COVER CONSTRUCTION FOR UPHOLSTERED FURNITURE
Filed Aug. 14, 1937    5 Sheets-Sheet 3
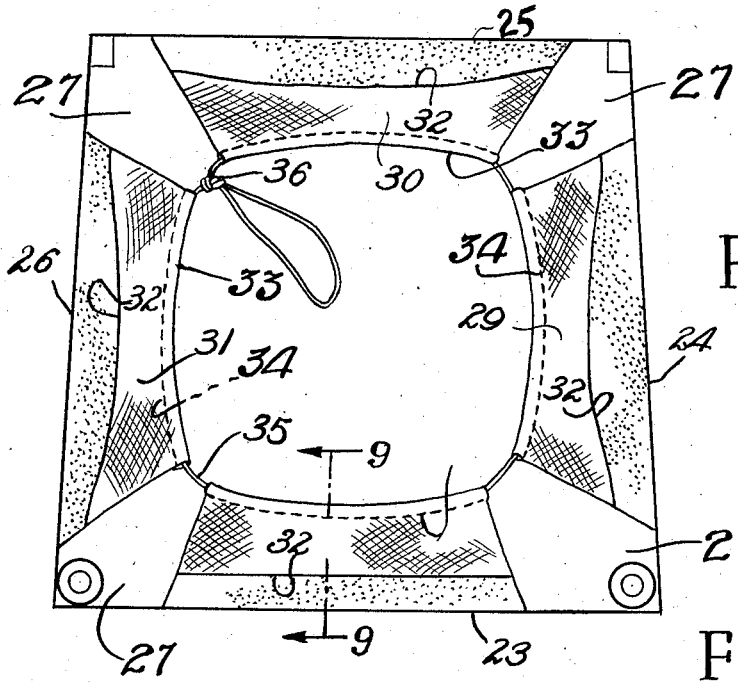
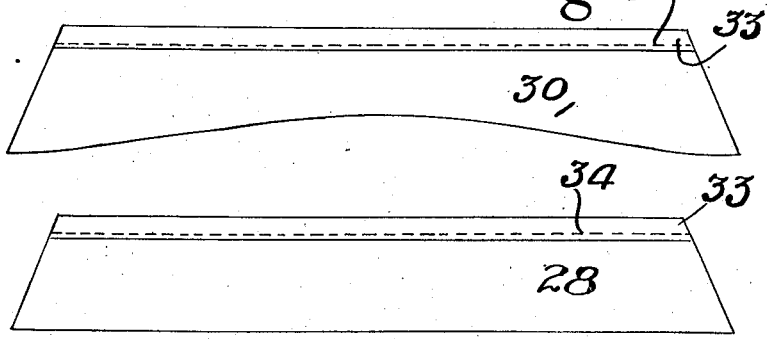
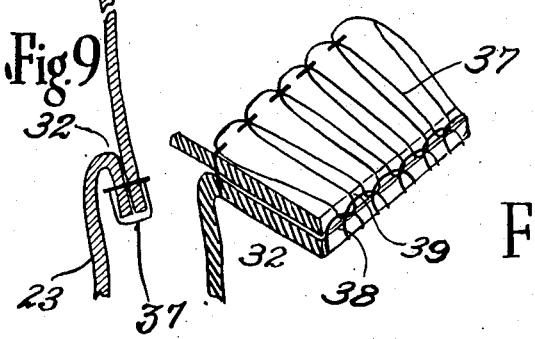
INVENTOR
JOSEPH A. KRASNOV
BY
Leonard L. Kalish
ATTORNEY

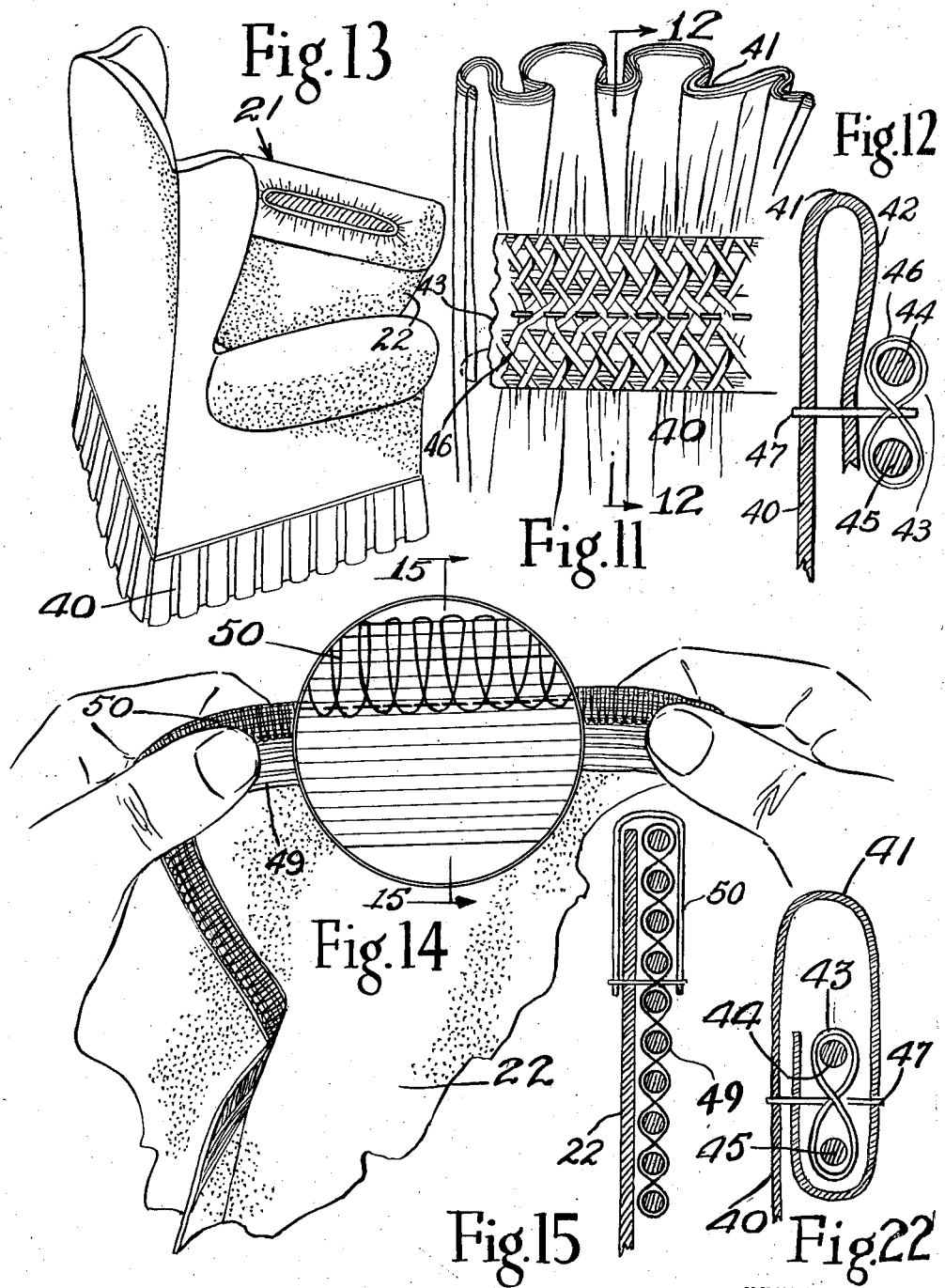

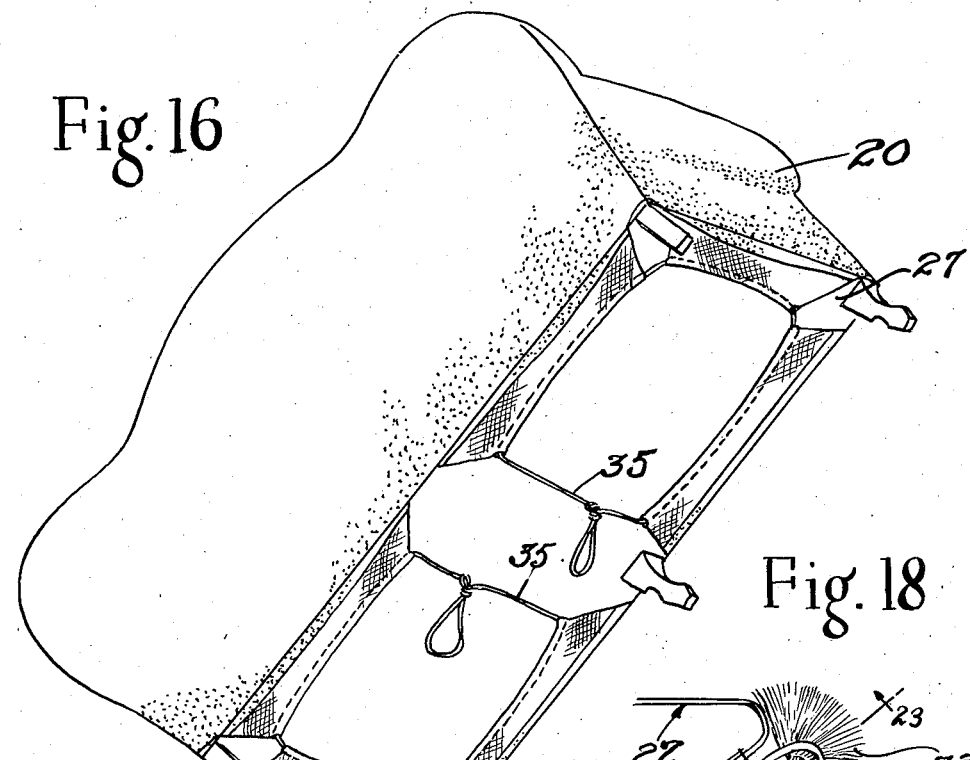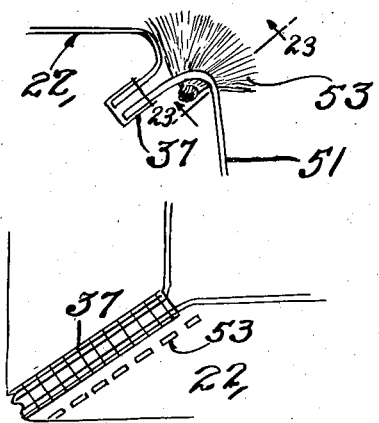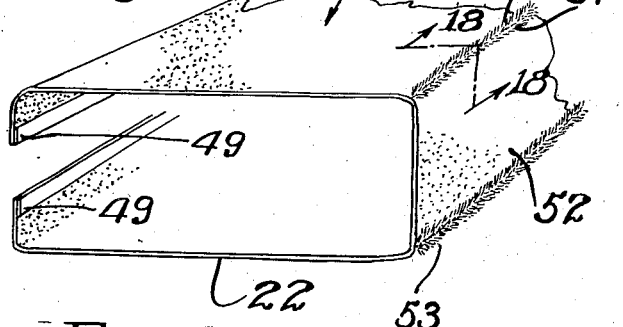

Patented Aug. 20, 1940

2,212,485

UNITED STATES PATENT OFFICE 2,212,485

SLIP COVER CONSTRUCTION FOR UPHOLSTERED FURNITURE

Joseph A. Krasnov, Philadelphia, Pa., assignor to Sure-Fit Products Company, Darby, Pa., a copartnership consisting of Joseph A. Krasnov and Samuel Krasnov Application August 14, 1937, Serial No. 159,189

4 Claims. (Cl. 155—182)

The present invention relates to certain new and useful improvements in slip covers for upholstered furniture, and it relates more particularly to ready-made slip covers.

In the accompanying drawings, in which like reference characters indicate like parts:

Figure 3 represents a perspective view similar to that shown in Figure 2 with the skirt portion shown partly in position and partly distended to illustrate its relationship to the body of the slip cover and with the slip cover securing means shown in its final or operative position.

Figure 4 represents a perspective view of the skirt portion of the slip cover of the present invention.

Figure 5 represents a similar fragmentary perspective view on an enlarged scale.

Figure 6 represents a plan view of the bottom portion of the slip cover.

Figure 7 represents a plan view of one of the side flaps.

Figure 8 represents a plan view of the front flap.

Figure 9 represents a fragmentary section on line 9—9 of Figure 6 on a much enlarged scale (schematically shown).

Figure 10 represents a perspective view of the the seam, shown in Figure 9 but on a still further enlarged scale (also schematic).

Figure 11 represents a fragmentary rear elevational view on an enlarged scale, of the upper ruffled or gathered edge-portion of the skirt.

Figure 12 represents a section on line 12—12 of Figure 11, shown somewhat diagrammatically or schematically.

Figure 13 represents a perspective view of a slip cover showing a separate cushion cover elastically drawn at the rear.

Figure 14 represents a perspective view of a portion of the elastic edge of the cushion cover (magnified in part).

Figure 15 represents a section on line 15—15 of Figure 14 on a much larger scale.

Figure 16 represents a perspective view, from beneath, of a sofa slip cover embodying the present invention.

Figure 17 represents a perspective sectional view on line 17—17 of Figure 1 on a much enlarged scale.

Figure 18 represents a somewhat diagrammatic or schematic sectional view on line 18—18 of Figure 17, on an enlarged scale.

Figure 19 represents a schematic perspective view of the inner corner of a seam showing the overlock stitching and showing the connecting portions of the generally U-shaped chenille-like tufts.

Figure 22 represents a section similar to that shown in Figure 12, but showing a modified form of skirt construction.

Figure 23 represents a sectional view on line 23—23 of Figure 18, looking in the direction of the arrows.

According to the present invention, a slip cover body 20 may be formed of any suitable knitted fabric, cut into suitable panels or portions and sewed along suitable seam lines by overlock stitching of the general character illustrated in Figures 9, 10 and 18 which does not unduly hinder the stretching of the knitted fabric.

The slip cover body 20 is made to any suitable shape or size but preferably not to include the cushion 21, but with its seat portion extending across beneath the cushion 21. A separate slip cover as at 22 is formed for the cushion.

Figure 2:
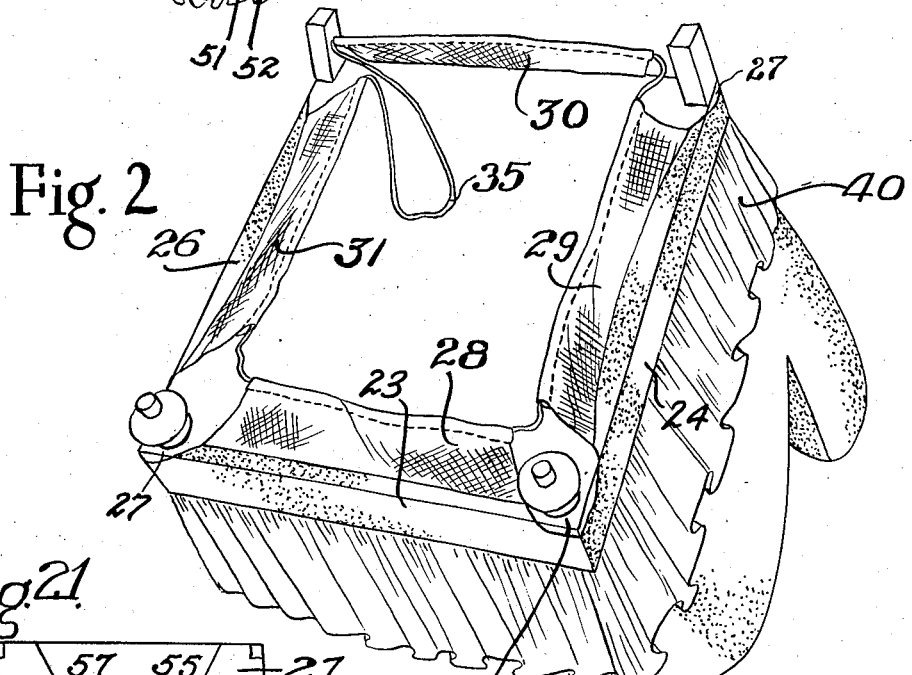
Figure 2 represents a perspective view of the under-side of a chair showing the means for securing the slip cover in place and illustrating the skirt of the slip cover (folded back).

The four lower sides of panels 23, 24, 25 and 26 on the body portion of the slip cover are separated at the corners as indicated at 27, and the separated portions are then turned under and inwardly beneath the lowermost horizontal frame members of the upholstered furniture, as shown particularly in Figures 2, 3 and 6, and to these inturned portions of knitted fabric, woven tabs or flaps 28, 29, 30 and 31 are sewn along the seams 32 indicated more particularly in Figures 9 and 10. The tabs or flaps 28, 29, 30 and 31 are provided along their inner edges with tubular hems 33 held by the line of sewn stitches 34, through which tubular hems a cord or tape 35 is drawn in a generally continuous fashion which may then be tied at one point as at 36 after it has been drawn tight so as to tension each of the flaps 28, 29, 30 and 31. The flaps 29, 30 and 31 are preferably curved along their seamed edges 32, so as to better tension the side panels of the slip cover.

In joining the woven fabric flaps 28, 29, 30 and 31 to the knitted fabric portion 23 of the slip cover, an overlock stitch 37 is employed which serves both to bind the raw edges 38 and 39 of the fabric and also serves to permit greater flexibility and stretch without breaking the stitches.

The skirt 40 is formed as a continuous loop but separable from the body of the slip cover and is preferably formed of the same knitted fabric of which the body of the slip cover is formed. The skirt is preferably shirred or gathered and provided with its upper edge 41 turned inwardly and back upon itself as at 42, and then sewn to an elastic cord or tape or an elastic band 43 as shown particularly in Figure 12. The elastic cord is preferably of the type containing two rubber bands 44 and 45 which are united within a common braided casing 46.

The band is stretched while being sewn to the skirt by the stitches 47 so that when the tape contracts, it gathers the skirt into ruffles as shown in Figures 1, 2, 3, 4, 5 and 11.

The skirt is formed into a continuous loop by joining the ends as for instance, along a vertical seam 48 and the elastic member 43 is made sufficiently tight so that the skirt will be held around the base of the furniture by means of the elastic;—the elastic being spaced an inch or two above the lowermost edge of the frame, so that the skirt overlaps the side portions 23, 24, 25 and 26 of the body of the slip cover. By this means, the skirt is detachably or demountably connected to the chair base over the side panels or portions 23, 24, 25 and 26 of the main body of the slip cover.

The cover 22 of the cushion shown in longitudinal section in Figure 17 is also formed of elastic fabric and the edges of the rear opening are then drawn together by means of an elastic tape 49 shown in enlarged section in Figure 15, which is sewn to the fabric by means of overlock stitches 50 in the manner indicated at Figure 15.

To the front edges 51 and 52 of the cushion, I may secure generally U-shaped tufts 53 to give a chenille-like tufting edge. Because the successive U-shaped tufts are independent of each other, this tufting does not prevent the free stretch of the fabric as would be the case with an ordinary chenille binding tape. The tufts 53 may extend through the fabric or through the seam formed upon the edges between two successive panels or pieces of fabric.

Such tufted edging may also be applied to other corner lines of the entire slip cover, either along the seam lines or without any seam lines being present at such corner lines. Such tufts are applied by means of a conventional-type machine somewhat analogous to a sewing machine but which pushes the successive U-shaped tufts through the fabric and cuts the tufts to a pre-determined length;—without the successive U-shaped tufts being connected to each other.

If desired, the elastic member 43 may be concealed as shown in Figure 22 by folding the inturned portion of the skirt material around the elastic member and sewing the same in place as indicated in Figure 22.

If desired also, a tubular hem may be formed upon the skirt through which an elastic or a non-elastic cord may be drawn;—in the latter case, the cord being tied on the inside of the hem so as to secure the skirt in place.

Figure 1:
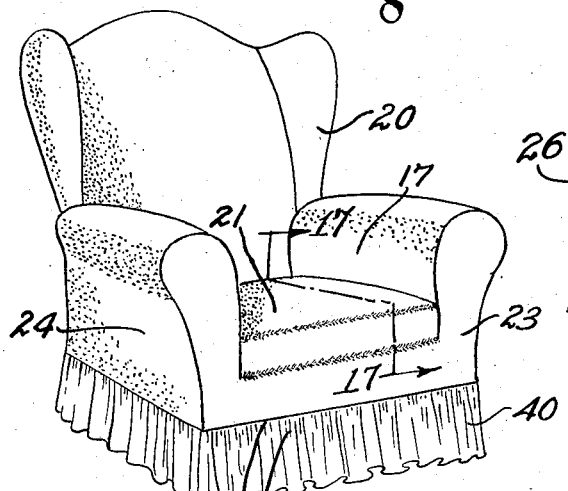
Figure 1 represents a perspective view of a slip cover embodying the present invention shown as applied to an upholstered arm chair.
Figure 20:
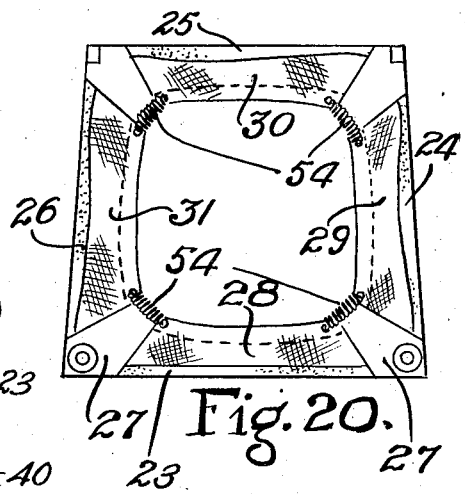
Figure 20 represents a plan view of the bottom flaps or tabs of the slip cover of the present invention with a modified form of inter-engaging means.

In place of the cord or tape 35 extending through the tubular seams of the flaps or tabs 28, 29, 30 and 31, a continuous and closely wound helical coil spring may be extended through these tubular seams to draw these flaps together or an elastic rubber band or strand may be drawn through the same;—the elasticity being sufficient to permit the slip-cover to be drawn over the furniture. Likewise, if desired, individual helical coil springs 54 may be provided intermediate the corners of the adjacent flaps and hooked into the same by forming the ends of the coils into suitable hooks to be hooked into the tabs directly or into metallic eyelets placed into the fabric of the flaps as indicated generally in Figure 20.

Figure 21:
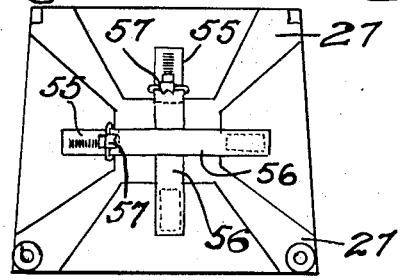
Figure 21 represents a plan view of the bottom flaps of the slip cover of the present invention showing a modified securing means.

Likewise, the tabs may be secured by means of adjustable fasteners such as shown in United States Patents Nos. 1,838,463, 1,887,825 and 1,887,826, by sewing the chain of links 55 to one of a pair of opposed flaps and by sewing a tape 56 carrying the slider 57 to the other of the pair of opposed flaps as indicated generally in Figure 21.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A slip cover for an article of furniture supported on legs and having a bottom spaced from the floor, said slip cover comprising a main body formed of elastic knitted fabric having portions adapted to encase substantially the entire lower side walls of the article and to project under the outer margins of its bottom, substantially non-stretchable woven fabric flaps secured to said portions, means securing the flaps together under tension, and a separable skirt having an elastic retainer band in its upper portion adjustably engageable over said named portions within a zone of the side walls of the article immediately above the plane of said bottom so as to form an apparently permanently connected part of the main body of the slip cover.

2. A slip cover for an article of furniture supported on legs and having a bottom spaced from the floor, said slip cover comprising a main body formed of elastic knitted fabric having portions adapted to encase substantially the entire lower side walls of the article and to project under the outer margins of its bottom, substantially non-stretchable woven fabric flaps secured to said portions, means securing the flaps together under tension, a separable skirt for engagement over said named portions having an upper margin adjustable within a zone of the side walls of the article immediately above the plane of said bottom so as to form an apparently permanently connected part of the main body of the slip cover, and an elastic retainer band sewed to said upper margin while said band is stretched beyond the perimeter of said bottom whereby said skirt becomes shirred or gathered upon release of said elastic band.

3. A ready-made slip cover adapted operatively to encase, in an apparently made-to-order manner, any one of a number of differently-sized upholstered articles of furniture each supported on legs and having a bottom spaced from the floor and each of which articles having substantially the same major structural features, said ready-made slip cover comprising a main body formed of elastic knitted fabric, said body including pocket-like portions adapted to encase the upper portions of said article of furniture and outer side panels extending downwardly from said pocket-like portions and adapted substantially completely to encase the outer side walls of said article of furniture, said side panels each being continuous and sufficiently long to extend under the bottom of said article of furniture, a separable skirt also formed of elastic knitted fabric having elastic retaining means at its upper portion adjustably engageable over said side panels above the plane of said bottom, so that in actual use the knitted skirt may adjustably hug the lower portion of the knitted main body of the slip cover to form an apparently permanently connected part therewith, and panel-tensioning means operatively associated with the portions of said side panels extending under the bottom of said article for operatively tensioning said side panels, whereby the main body of said ready-made slip cover on the one hand, and the skirt portion of said cover on the other hand, may be adjusted independently of each other to best fit the encased article of furniture, thereby jointly to provide a slip cover which upon adjustment will fit the article of furniture in an apparently made-to-order manner.

4. A ready-made slip cover adapted operatively to encase, in an apparently made-to-order manner, any one of a number of differently-sized upholstered articles of furniture each supported on legs and having a bottom spaced from the floor and each of which articles having substantially the same major structural features, said ready-made slip cover comprising a main body formed of elastic knitted fabric, said body including pocket-like portions adapted to encase the upper portions of said article of furniture and outer side panels extending downwardly from said pocket-like portions and adapted substantially completely to encase the outer side walls of said article of furniture, said side panels each being continuous and sufficiently long to extend under the bottom of said article of furniture, an independently adjustable separable skirt formed of suitable fabric and having retaining means at its upper portion adjustably engageable over said side panels above the plane of said bottom of the article of furniture, so that in actual use the skirt may adjustably hug the lower portion of the knitted main body of the slip cover to form an apparently permanently connected part therewith, and panel-tensioning means operatively associated with the portions of said side panels extending under the bottom of said article for operatively tensioning said side panels, whereby the main body of said ready-made slip cover on the one hand, and the skirt portion of said cover on the other hand, may be adjusted independently of each other to best fit the encased article of furniture, thereby jointly to provide a slip cover which upon adjustment will fit the article of furniture in an apparently made-to-order manner.

JOSEPH A. KRASNOV.